United States Patent
Loy et al.

(10) Patent No.: US 7,460,693 B2
(45) Date of Patent: Dec. 2, 2008

(54) METHOD AND APPARATUS FOR THE AUTOMATIC DETECTION OF FACIAL FEATURES

(75) Inventors: Gareth Loy, Australian Capital Territory (AU); Colin Thomsen, Australian Capital Territory (AU)

(73) Assignee: Seeing Machines Pty Ltd (AU)

( * ) Notice: Subject to any disclaimer, the term of this patent is extended or adjusted under 35 U.S.C. 154(b) by 342 days.

(21) Appl. No.: 10/951,081

(22) Filed: Sep. 27, 2004

(65) Prior Publication Data

US 2005/0041867 A1 Feb. 24, 2005

Related U.S. Application Data

(63) Continuation of application No. PCT/AU03/00345, filed on Mar. 21, 2003.

(30) Foreign Application Priority Data

Mar. 27, 2002 (AU) .................................... PS1405

(51) Int. Cl.
*G06K 9/00* (2006.01)

(52) U.S. Cl. ........................ 382/118; 382/103; 382/117; 382/199

(58) Field of Classification Search ................. 382/103, 382/117, 118, 190, 199
See application file for complete search history.

(56) References Cited

U.S. PATENT DOCUMENTS

| | | | | |
|---|---|---|---|---|
| 5,291,560 A | | 3/1994 | Daugman | 382/2 |
| 5,479,529 A | * | 12/1995 | Nakagawa et al. | 382/118 |
| 5,781,650 A | * | 7/1998 | Lobo et al. | 382/118 |
| 5,850,470 A | * | 12/1998 | Kung et al. | 382/157 |
| 5,859,921 A | * | 1/1999 | Suzuki | 382/118 |
| 5,912,980 A | * | 6/1999 | Hunke | 382/103 |
| 6,108,437 A | * | 8/2000 | Lin | 382/118 |
| 6,157,737 A | * | 12/2000 | Ishikawa et al. | 382/195 |
| 6,381,345 B1 | * | 4/2002 | Swain | 382/117 |
| 6,671,391 B1 | * | 12/2003 | Zhang et al. | 382/118 |
| 6,707,933 B1 | * | 3/2004 | Mariani et al. | 382/118 |

(Continued)

FOREIGN PATENT DOCUMENTS

EP 1 128 316 8/2001

(Continued)

OTHER PUBLICATIONS

Tony S Jebara et al, "Parametrized Structure from Motion for 3D Adaptive Feedback Tracking of Faces", Nov. 28, 1996 MIT Media Laboratory, Perceptual Computing Technical Report #401, p. 1-8.*

(Continued)

*Primary Examiner*—Gregory M Desire
(74) *Attorney, Agent, or Firm*—St. Onge Steward Johnston & Reens LLC (57) ABSTRACT

A method of utilizing a computer system to automatically detect the location of a face within a series of images, the method comprising the steps of: detecting eye like regions within the series of images; utilizing the eye like regions to extract potential face regions within the series of images; enhancing the facial features in the extracted potential face regions; classifying the features; and verifying the face topology within the potential face regions.

16 Claims, 7 Drawing Sheets

U.S. PATENT DOCUMENTS

| | | |
|---|---|---|
| 6,885,766 B2 * 4/2005 | Held et al. | 382/167 |
| 6,895,103 B2 * 5/2005 | Chen et al. | 382/117 |
| 6,920,237 B2 * 7/2005 | Chen et al. | 382/117 |
| 7,027,619 B2 * 4/2006 | Pavlidis et al. | 382/115 |
| 7,043,056 B2 * 5/2006 | Edwards et al. | 382/103 |
| 7,058,209 B2 * 6/2006 | Chen et al. | 382/117 |
| 7,062,073 B1 * 6/2006 | Tumey et al. | 382/118 |
| 7,092,554 B2 * 8/2006 | Chen et al. | 382/118 |
| 7,113,637 B2 * 9/2006 | Huang et al. | 382/165 |
| 7,382,902 B2 * 6/2008 | Tisse et al. | 382/117 |
| 2002/0126901 A1 * 9/2002 | Held | 382/199 |

FOREIGN PATENT DOCUMENTS

| | | |
|---|---|---|
| EP | 1 229 486 | 8/2002 |
| EP | 1 255 225 | 11/2002 |
| JP | 2000132688 | 5/2001 |
| JP | 2001250121 | 9/2001 |
| WO | WO 96/38808 | 12/1996 |

OTHER PUBLICATIONS

Tsuyoshi Kawaguchi et al,"Detection of Eyes From Human Faces By Hough Transform And Separability Filter", 2000, IEEE, pp. 49-52.*

Gareth Loy et al "A Fast Radial Symmetry Transform for Detecting Points of Interest", 2002, Australian National University.*

Gareth Loy et al, "Fast Radial Symmetry for Detecting Points of Interest", Aug. 2003, IEEE, Transactions on Pattern Analysis and Machine Intelligence, vol. 25, No. 8, pp. 959-973.*

* cited by examiner

ORIGINAL IMAGE

DARK RADIAL SYMMETRY IMAGE

FIG. 5

POTENTIAL EYE LOCATIONS

METHOD AND APPARATUS FOR THE AUTOMATIC DETECTION OF FACIAL FEATURES

This application is a continuation of pending International Patent Application No. PCT/AU2003/000345 filed on Mar. 21, 2003 which designates the United States and claims priority of pending Australian Patent Application No. PS1405 filed on Mar. 27, 2002.

FIELD OF THE INVENTION

The present invention relates to a method of automatic detection of facial features in an image. The present invention is applicable to the detection of facial features in either still images or a sequence of video images.

BACKGROUND OF THE INVENTION

Automatic facial feature detection is a desirable feature of face and gaze tracking systems, as it enables the system to cope with new users without prior knowledge of the user's appearance. Prior art systems are known which can achieve automatic feature detection.

However, these are limited in their robustness and application, as they are unable to cope with, inter alia, a wide variety of individual appearances, and variable lighting conditions.

The majority of prior art base detection systems rely heavily on skin color to locate the face within video images, and thus they may be highly sensitive to lighting conditions and are unable to operate using monochromatic images.

Whilst the present invention has particular application to the field of facial feature detection, it will be obvious to those skilled in the art that it is not limited thereto and is applicable wherever automatic feature detection is required.

SUMMARY OF THE INVENTION

In accordance with a first aspect of the present invention, there is provided a method of utilizing a computer system to automatically detect the location of a face within at least one image, the method comprising the steps of: (a) detecting a pair of eye locations within the at least one image; (b) utilizing the pair of eye locations to extract potential face regions within the at least one image; (c) enhancing the facial features in the extracted potential face regions; (d) classifying the features; and (e) verifying the face topology within the potential face regions.

Preferably step (a) further comprises the sub steps of identifying a plurality of eye candidates using a fast symmetry transform; applying a Hough transform centered on each one of the plurality of eye candidates; rating the quality of each of the plurality of eye candidates; and, selecting one pair of eye locations from the plurality of eye candidates based on one or more geometrical constraints.

Step (b) can further include the step of utilizing the location of the detected pair of eye locations to extract a region around the location to form the potential face region.

Preferably step (c) further comprises utilizing local radial symmetry to construct a face mask of likely facial features within the potential face regions. It is also preferable that step (c) further comprises resealing the intensity of the facial features within the potential face region.

Step (d) can further comprise locating at least one of the mouth, nostrils or eyebrows of a face.

In a preferred embodiment the step of verifying the face topology includes using the spatial relationship between facial features in the images.

Preferably the at least one image is part of a series of images.

According to a second aspect of the present invention there is provided a method of detecting at least one facial feature of a subject in an image, the method including the steps of: (a) determining a pair of points, within the current image, representing the position of the subject's eyes; (b) selecting at least a portion of the current image, based on the position of the points within the current image; (c) enhancing the selected portion of the current image; (d) detecting one or more features within the enhanced image portion; (e) classifying the one or more detected features as potential facial features; and (f) determining whether at least one facial feature has been identified by comparing the relative positions of the one or more potential facial features within the enhanced image portion with at least one facial feature positioning condition.

Preferably the step of determining a pair of points within the current image, representing the position of the subject's eyes includes the sub steps of: identifying a plurality of candidate points using a fast symmetry transform; applying a Hough transform centered on each one of the candidate points; rating the quality of each of the plurality the candidate points, based on at least one of the following: the fast symmetry transform, the Hough transform, a correlation measurement, or an intensity value centered on the candidate point; and selecting one pair of points from the plurality of candidates points.

Preferably the image is one image of series of images, such as an image in a video sequence.

BRIEF DESCRIPTION OF THE DRAWINGS

Notwithstanding any other forms which may fall within the scope of the present invention, the preferred embodiments of the invention will now be described, by way of example only, with reference to the accompanying drawings in which.

DETAILED DESCRIPTION OF THE EMBODIMENTS

The preferred embodiment of the present invention provides a system and method which can be used for automatic detection of facial features in monocular monochrome images. This enables the system and method to provide robust facial feature detection even in conditions of changing light, and allows the system and method to function with a wide range of image capturing devices. In broad terms the preferred embodiment of the present invention extracts a face region from a video sequence based on a pair of eye locations identified in an image frame or video sequence. The features within the face region are enhanced then the features are classified. Once the features are classified, the facial feature topology is verified against a predetermined set of rules to ascertain whether a valid set of facial features have been located.

Figure 1:
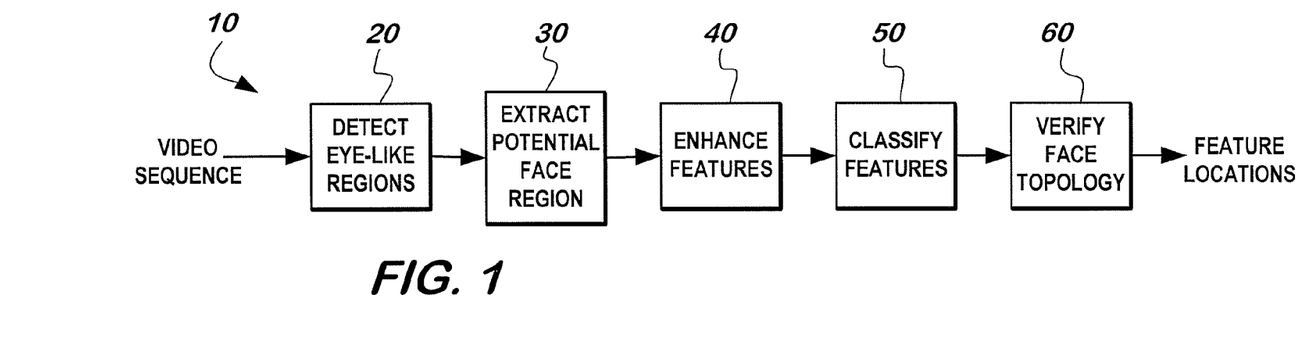
FIG. 1 is a flow chart outlining the steps of the facial feature detection method of the preferred embodiment.

FIG. 1 shows a flow chart of the method according to an embodiment of the present invention. The method 10 comprises five steps 20 to 60. The initial step 20 in the method 10 is that of detecting eye-like regions in a video image. Next 30, a potential face region is extracted from the image, then the features within the extracted face region are enhanced 40. Next, a plurality of potential facial features are identified and classified 50 according to their position in the potential facial region. In step 60, once the position of each of the candidate facial features is known the facial feature topology can be compared against a template or set of rules to determine whether a valid set of facial features has been found. If at any point during the method, it becomes evident that the features do not represent a face then the candidate face region is discarded and the system returns to step 20, looking for other eye-like regions within the image. This process can be repeated until a suitable set of facial features is detected within the image.

The steps 20 to 60 will now be described in further detail with reference to FIGS. 2 to 10 of the accompanying drawings.

Figure 2:
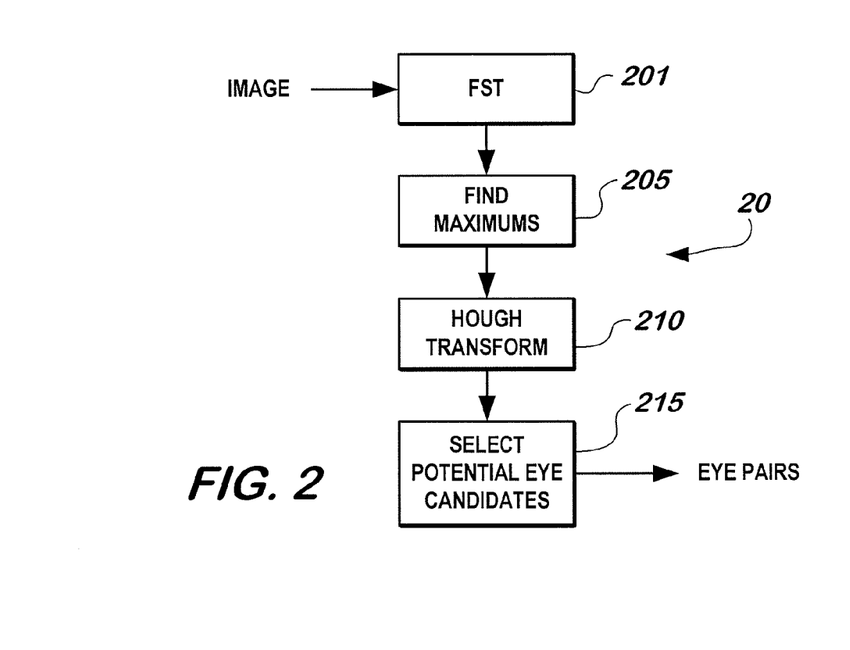
FIG. 2 is a flow chart depicting the sub-steps of a subroutine for detecting eye-like regions, in the method of FIG. 1.
Figure 3:
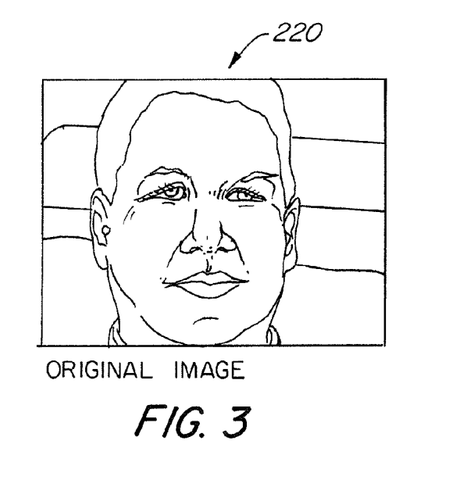
FIG. 3 to FIG. 6 illustrate the results of applying the subroutine of FIG. 2 to the image of FIG. 3.
Figure 4:
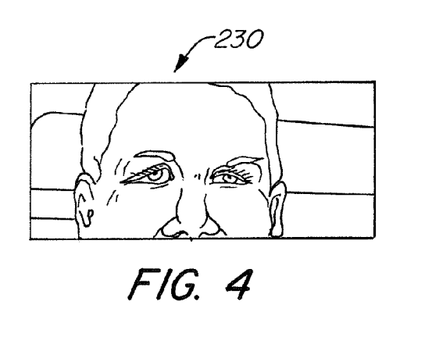

Turning firstly to the sub process used for the detection of eye-like regions (step 20 of FIG. 1), one example process is outlined in more detail in FIG. 2.

By way of overview, the eye detection process uses dark radial symmetry 201 to identify potential eye images. Dark radial symmetry has been found to provide useful feature cues when applied to a face. See for example "The Fast Symmetry Transform" Internal Technical Report, Robotic Systems Laboratory ANU, 2001, by Loy, G. et al and Loy, G. and Zelinsky, A., "A Fast Radial Symmetry Transform for Detecting Points of Interest", Proceedings of European Conference on Computer Vision (ECCV2002), Copenhagen, May 2002. Such a technique can be adapted specifically to detect regions that are likely to be eyes. It will be evident to the skilled reader that other dark radial transforms may be utilized. An additional verification stage 210 is then provided using the circular Hough transform to further isolates potential eye regions. Subsequent processing stages are then used to eliminate the small number of false matches that occur.

In the first step 201, the image denoted I[t] is processed using a fast symmetry transform (FST), which returns a number of potential eye candidates. The image is then, in step 205, divided horizontally into a number of regions, and the maximum FST result is determined for each of these regions. In the preferred embodiment 8 regions were selected. Next, in step 210, a circular Hough transform is applied to an area centered on the maximum FST response in each region. In the final step 215, potential pairs of eye candidates are selected based on geometrical constraints, and the best pair of eye candidates are selected as the eye locations. The other pairs are saved, and if subsequent processing fails, the next best pair of eye-like regions are selected as the eyes.

An example of the application of this process is shown in FIG. 3 to FIG. 6 which show an image during four stages of the process for the detection of eye pairs. The image stages, 220, 230, 240 & 250 represent the image in its original state (220), the image (230) when cropped to 320×240 pixels, the dark radial symmetry image (240) and the cropped image of 230 showing potential eye locations (250). The original image is cropped to remove potential false eye candidates, particularly in the mouth region. The face is assumed to fill the image and so the eyes must be towards the top of the image. The cropped image has the same number of columns, but starts at the 20th row. The new image size can therefore be about 320×240.

Figure 5:
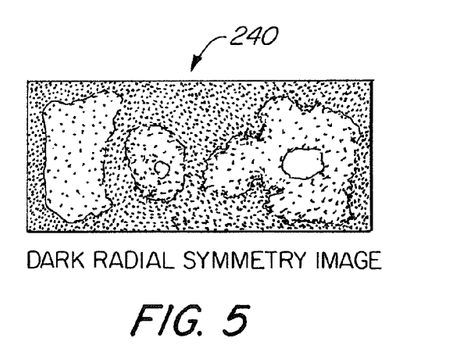
Figure 6:
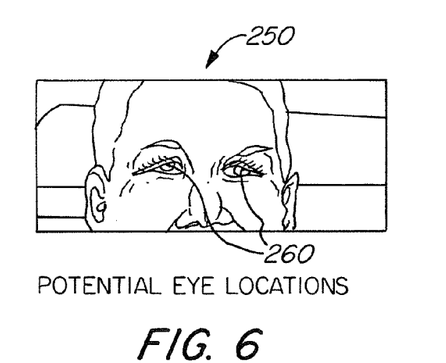

Next, the dark radial symmetry operator is applied for radii of 13, 17 and 21 pixels. The dark radial symmetry image 240 shows the result of this operation. In the next step 210, the circular Hough transform is applied in a range centered on the estimated eye radius. This range can be varied to suit, but typically includes at least 5 closely spaced eye radii.

The final step 215 is to determine which are the strongest eye candidates. To do this the maximum circular Hough transform result is combined with a correlation measurement and the intensity value to provide an estimate of the how 'good' an eye candidate is. The correlation is determined by selecting two overlapping patches that are centered on the maximum Hough response, flipping one region and correlating. The maximum correlation result is taken as the best (x, y) position for an eye. The eye candidate quality can then be determined using the formula:

$$quality = max\_correlation * Hough(x, y)^2 * (255-intensity)^2$$

As described above, once eye candidates are selected they are paired according to geometrical constraints. In this embodiment eye pairs are selected by ensuring that the eyes lie on a line that is no more than 30 degrees to the horizontal and which are within a valid distance from each other.

Figure 7:
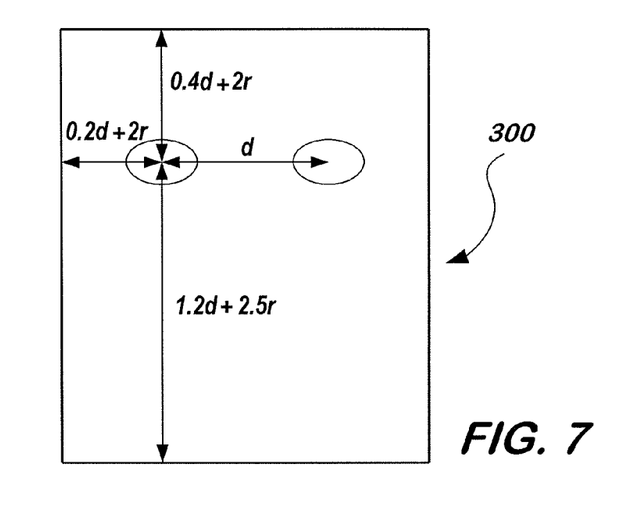
FIG. 7 shows a schematic view of an exemplary face region used in the method of FIG. 1.

FIG. 7 shows a schematic representation of a face region 300 which is then extracted from the image. The size of the face region is based upon the distance d between the two eyes of the selected eye pair and the approximate radius of the iris r. Prior to extraction of the potential face region from the image, the entire image is rotated to align the eye pair with the horizontal. As will be appreciated by the person skilled in the art, an appropriate interpolation method, such as bilinear interpolation, can be used to calculate the pixel intensities of the rotated image. A rectangular face region 300 is then cropped from the rotated image. Suitable dimensions for the cropped face region 300 are shown in FIG. 7.

The next step 40 in the method 10 of FIG. 1 is the enhancement of facial features. The process for enhancing the features in the face region is shown in more detail in FIG. 8. The process includes the steps of calculating a gradient image for 410, calculating the local radial symmetry 420, face mask determination 430, re-scaling the intensity 440 and undertaking a local comparison operation 450 to produce a feature enhanced output image.

In FIG. 9 to FIG. 13, there is depicted a number of images produced from each of the steps involved. The images include an initial cropped sample image 510, the resultant radial symmetry calculation 520, determining a face mask 530, re-scaling the image 540 and creating the enhanced image 550.

Figure 8:
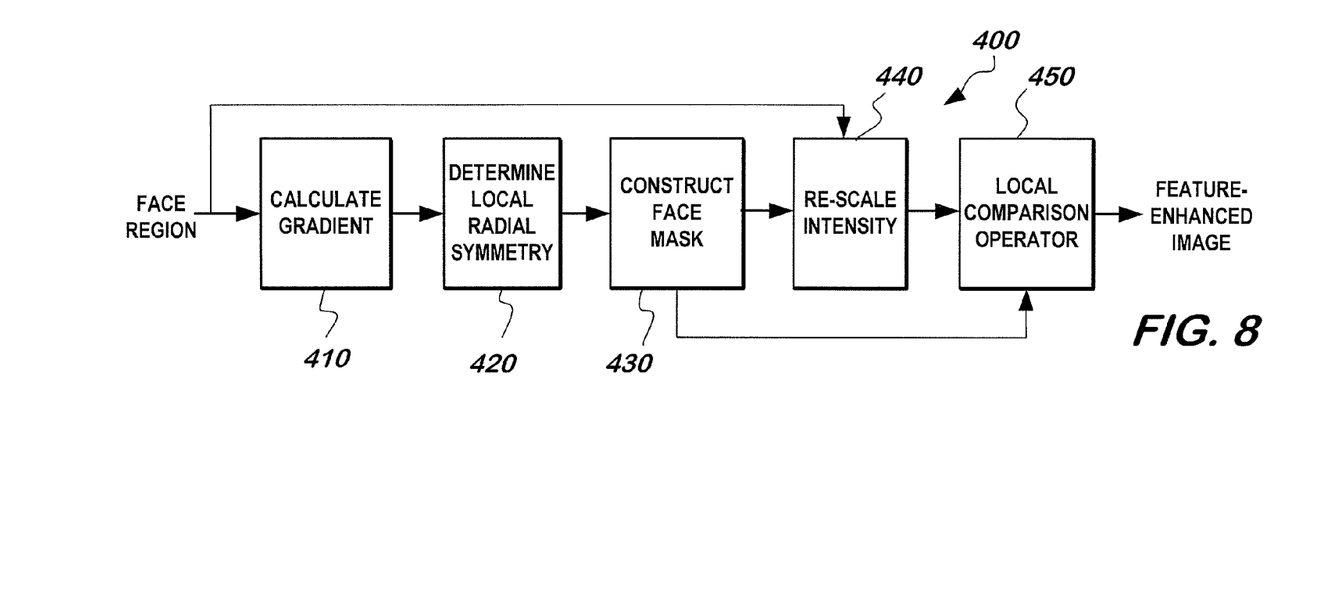
FIG. 8 shows the sub-steps in a subroutine for enhancing features in the face region of FIG. 7.
Figure 9:
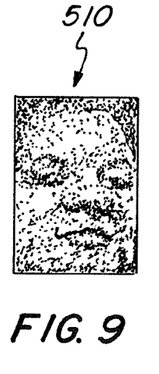
FIG. 9 to FIG. 13 shows a series of 5 images, each image being the output of a respective step of the process depicted in FIG. 8.
Figure 10:
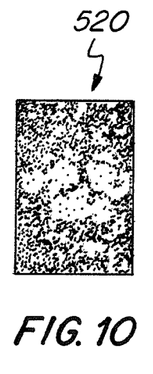
Figure 11:
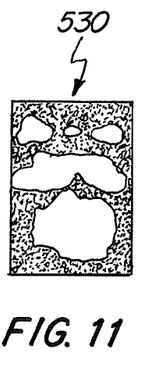
Figure 12:
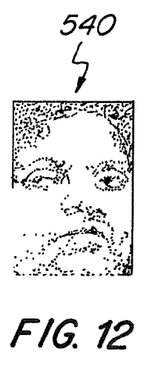

In steps 410 to 430 of FIG. 8, a facemask is constructed. The facemask is constructed such that it contains all of the facial features within the image and as little of the rest of the face as possible. The facemask is constructed using the radial symmetry of the image. Radial symmetry has been found to peak in the vicinity of facial features. The local radial symmetry of the image is estimated at each point in the face region based on gradient orientation using a fast symmetry transform step 420. A suitable fast symmetry transform can be found in the previously described articles due to Loy & Zelinski.

The result is then blurred using a rectangular Gaussian filter (r+1 high, 3r+1 wide with $\sigma_x$,=3r, $\sigma_y$=r). The resultant image is shown in image 520 of FIG. 10. The resulting image was then binarised (FIG. 11) by thresholding at 30% of its maximum value. In step 430, the facemask was constructed by combining the binarised mask with a 2d×d rectangle centered a distance d below the eyes. The binarised mask is expected to cover the eyes, nose and mouth corners but due to lack of radial symmetry it may miss the centre of the mouth. For this reason, in order to ensure the whole mouth is included in the mask, the 2d×d rectangle is added to the binarised mask. An exemplary mask is shown 530 of FIG. 11.

In step 440, the entire image of the face region is re-scaled based on the maximum intensity $b_{up}$ and minimum intensity $b_{low}$ of the intersection of the face region and the facemask. The intensity values of the entire face region are re-scaled by mapping intensities in the interval $[b_{low}, 0.8b_{up}]$ to [0, 1] and intensities below or above $[b_{low}, 0.8b_{up}]$ up to 0 and 1 respectively. The result of step 440 is shown in image 540 of FIG. 12.

In step 450, a local comparison operator is used to enhance the features of the re-scaled image. The value of the operator is calculated at each pixel p by comparing the intensity of that pixel with the intensities of each member of a set of pixel's S(p) whose locations are fixed relative to p. The operator L quantifies the proportion of these pixel's whose intensities are greater than I(p)+K where I(p) is the intensity at pixel p and k is a constant called a minimum difference threshold. The local comparison operator L is defined as $$L(p, S, k) = \frac{\|\{q : (q \in S(p)) \wedge (I(q) > I(p) + k)\}\|}{\|S(p)\|}$$

Where $\| \ldots \|$ indicates cardinality, that is, the number of elements in the set.

Figure 14:
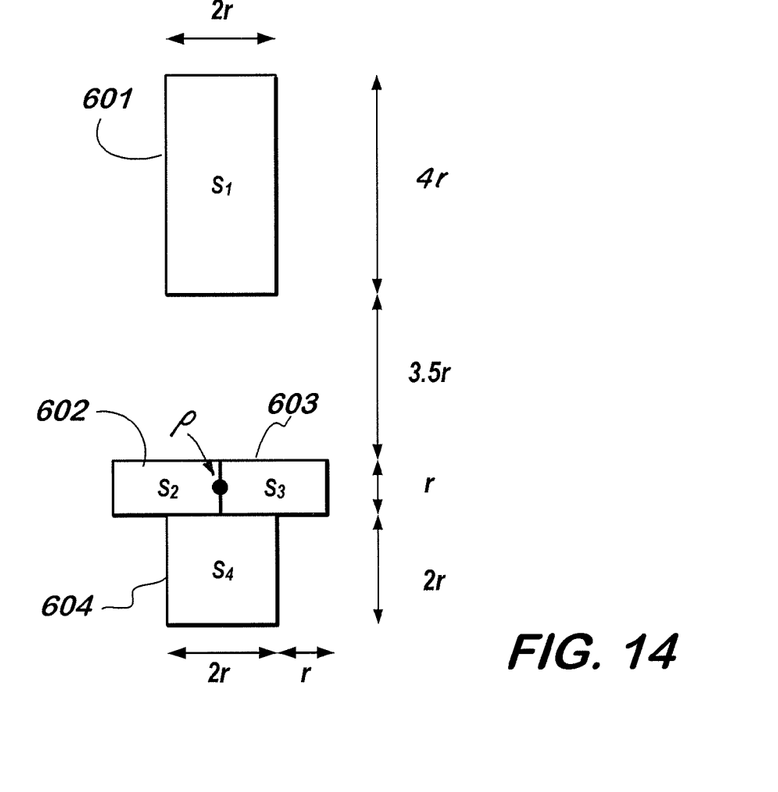
FIG. 14 shows a series of regions $S_i$ used by a local comparison operator for enhancing facial features in an embodiment of the present invention.

In the present embodiment, four regions S are used with each region having a different value of k. An exemplary set of regions $S_i$ (601-604) are used to calculate the intensity of pixels in the enhanced image is shown in FIG. 14.

$I_{enhanced}$ can be calculated using the following formula:

$$I_{enhanced} = (1-0.9L_1)(1-L_4)(1-0.9L_{sides}),$$

where $$L_{sides} = (1-0.5L_2)(1-0.5L_3)$$

Where $k_i$=0.05 for i=1,4 and $k_i$=0.25 for i=2,3.

Figure 13:
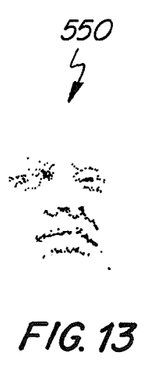

An exemplary enhanced image is shown in image 550 of FIG. 13 with enhancement of the facial features being clearly evident.

Figure 15:
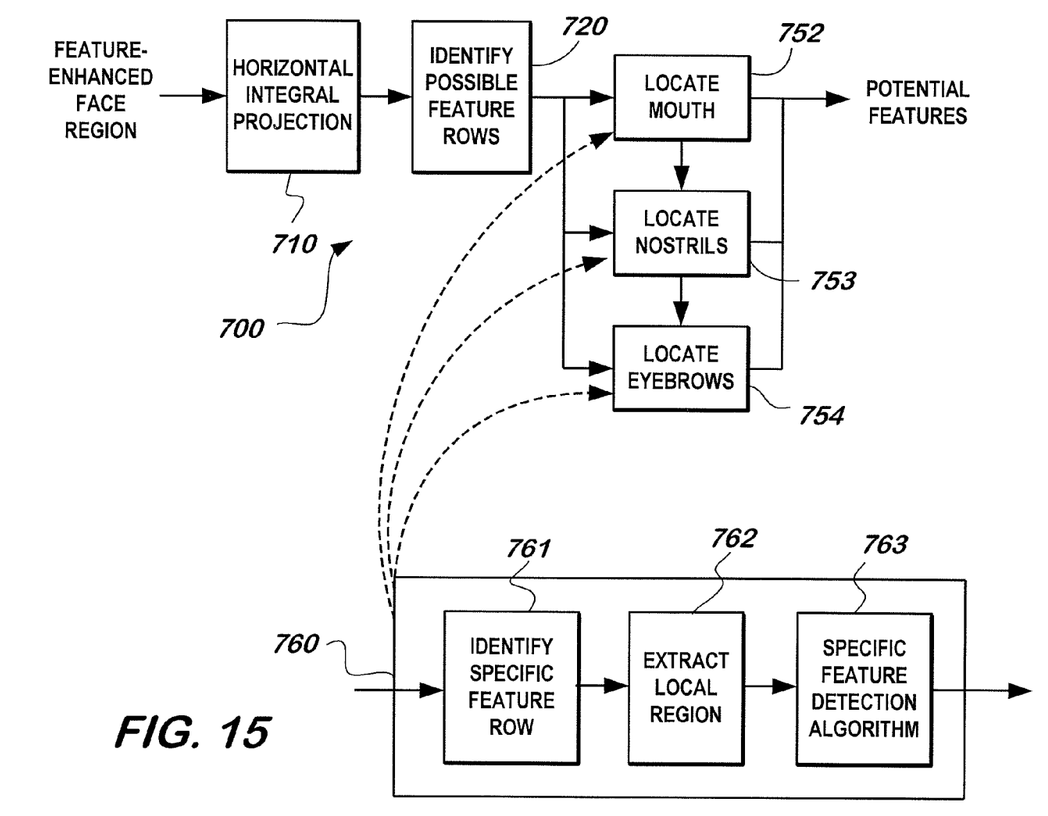
FIG. 15 shows the sub-steps of a subroutine for locating facial features within the method of FIG. 1.

Next, the facial features within the face region are classified. FIG. 15 outlines the procedure for locating facial features. Using the enhanced image (e.g. 550 of FIG. 13) the method for locating facial features 700 begins with a horizontal integral projection step 710. The integral projection of the enhanced image on the vertical axis is taken and smoothed with a Gaussian. In this embodiment the Gaussian is equal to 1×(2r+1) with σ=r/3.

Next, in step 720, the five highest local maxima are selected as potential feature rows.

Next, horizontal sections 3r high are taken across the face region centered on each potential feature row, and a vertical integral projection of the horizontal section is calculated. Again the integral projection is smoothed using the Gaussian as with the horizontal integral projection of step 710. The four highest local maximum in each of the horizontal sections are identified as potential feature columns. Thus, a set of potential feature rows is extracted each with a corresponding set of potential feature columns.

The next step is that of identifying the mouth 752, nostrils 753 and eyebrows 754 sequentially using the potential feature rows and their respective potential feature columns. If either the mouth or nostrils are not found or the features which are found do not match within a predetermined distance, no face is taken to be detected within the frame, and the process returns to step 10 of FIG. 1.

The feature location process for each feature follows the procedure outlined in box 760 of FIG. 15. Firstly, in step 761 a feature row is determined, next, in step 762, local search regions are extracted for the left and right features, these are re-scaled to optimize the intensity distribution within the local search regions. In step 763, a feature specific detection algorithm is used to identify each particular feature. The process for locating the eyebrows is somewhat different to that of the mouth and nostrils, in that a feature row for the eyebrows is not identified from the integral projection, rather the eyebrows are searched for in a portion of the enhanced face region based on the detected position of the eyes.

Figure 16:
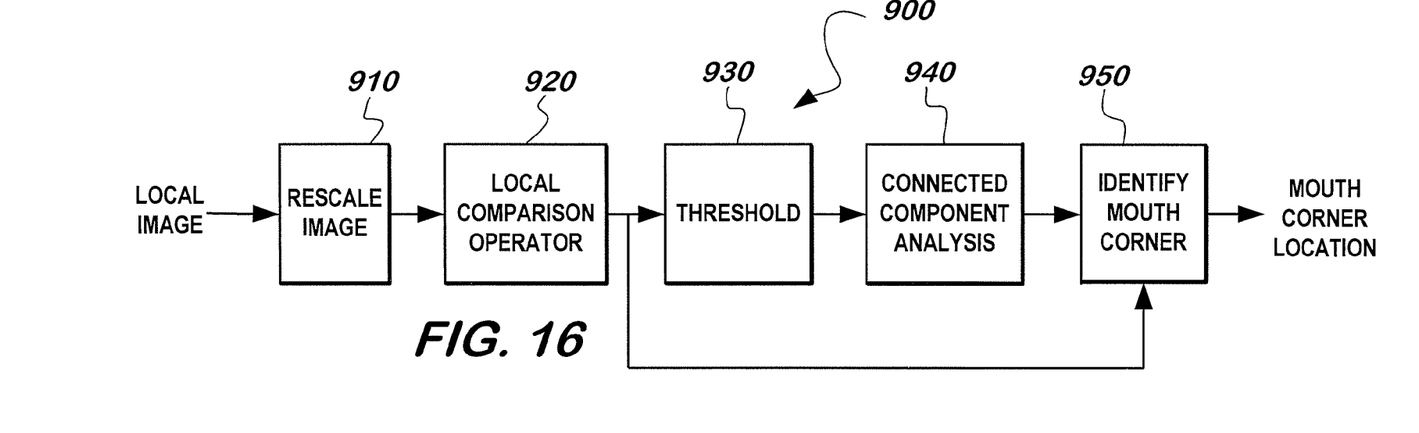
FIG. 16 shows the sub-steps of a process for locating a mouth corner in the feature finding subroutine of FIG. 15.
Figure 17:
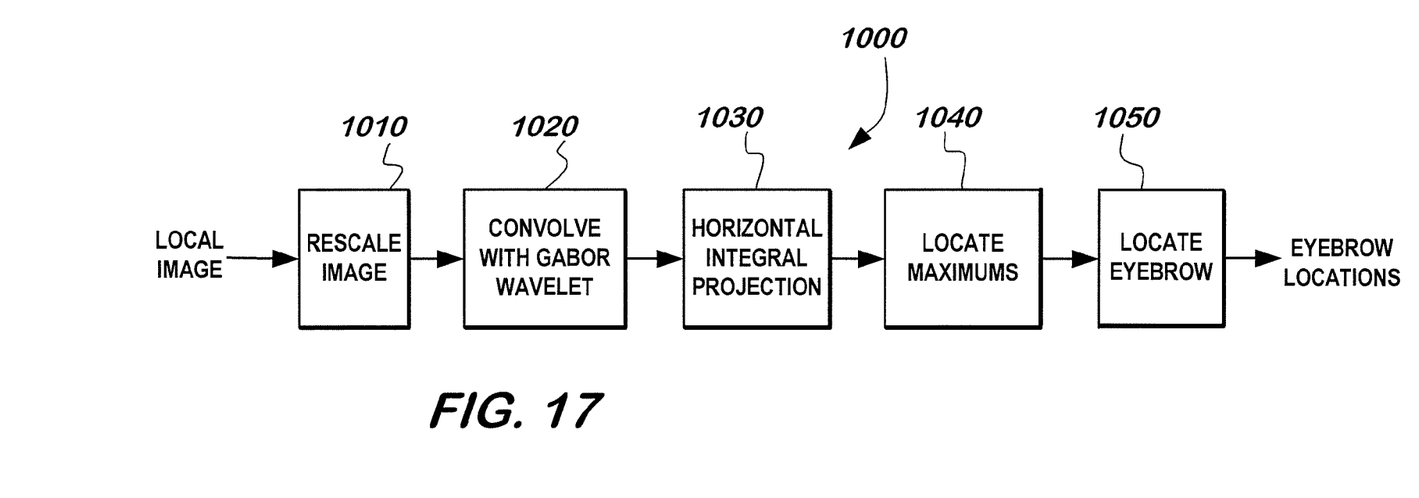
FIG. 17 shows the sub-steps of process for locating eyebrows in an image in the feature finding subroutine of FIG. 15.

FIG. 16 and FIG. 17 depict schematic representations of the processes for locating the mouth corners and eyebrows, respectively. First, as shown in FIG. 16, the mouth corners are located. A rule is set for determining which feature row to use when searching for the mouth corners. In this embodiment, the mouth row is identified as the potential feature row with the highest integral projection that is located beneath the eyes. The mouth row must be at least 0.7d below the eye row or else the face is declared invalid.

The mouth corners are searched for in 3r×0.6d regions centered on the mouth row, directly below each eye. In the initial step 910 of searching for the mouth corners 900 each of these regions is re-scaled so its intensity is spread over [0,1].

Next in step 920, the local comparison operator L is again used to highlight regions that have lighter regions above them and below them, and which lie towards the outside of the face. The local comparison operator generates $I_{above}$, $I_{below}$ and $I_{side}$. The regions $S_i$ used to calculate the local comparisons are one-dimensional lines of points extending 0.05d in the direction of interest away (i.e. above, below or to the side) from the point under consideration.

The output of two of the local comparison operators for the regions above and below the point of interest are combined as follows:

$$C_{ab} = I_{above} \cdot I_{below}$$

The result is binarised into positive and zero elements, and connected-component analysis used to identify the largest non-zero region (steps 930 and 940). This then forms a mask $M_{mouth}$ within which the mouth is assumed to lie. A cue for the mouth location $C_{mouth}$ can now be determined by combining the results of the local comparison operators, blurring horizontally, and masking, $$C_{mouth} = c*(I_{above}I_{below} \cdot (1-I_{side})) \cdot M_{mouth}$$

where $c$ is a 1×0.05$d$ length vector of ones.

Next $C_{mouth}$ is binarised in step 950 with a threshold set at 50% of the maximum value of $C_{mouth}$ and the edge of the mouth is identified as the non-zero column furthest from the centre of the face. The height of the mouth corners is determined by blurring the column of $C_{mouth}$ in which the mouth edge is located (by convolution with $c^T$) and finding the maximum point.

As described above in relation to the process for detecting the best eye-pair and detecting the mouth corners, a set of rules can be applied to decide which feature row is most likely to contain a pair of nostrils. The nose row is chosen as the most prominent possible feature row that lies between the eyes and the mouth. If the row is higher than two thirds of the way between the mouth and eyes then the face is invalid, and no further effort is spent attempting to locate features, with the method returning to the beginning.

If the row height is appropriate, the system can proceed to locate a number of possible nostril locations. A vertical integral projection of the feature region is performed. Each peak in the integral projection onto the x-axis that was calculated in the horizontal region centered at the nose row gives an x-coordinate of a possible nostril location. The y-coordinates are determined by calculating a local integral projection onto the y-axis in a 2rx2r region centered on the determined x-coordinate and the original feature row. The maximum of this local y integral projection gives the y-coordinate of the potential nostril location. Thus, a plurality of possible nostril locations have been identified. The system then considers each possible pair of locations to find plausible pairs that fit a series of predetermined nostril selection rules. If the nostrils are not detected in the most prominent row then the next most prominent row is tested. In this embodiment nostrils pairs are selected that are:

on both sides of the mouth centre,
approximately the same height (within a difference r),
close together (not more than 0.4d apart), and
not too close together (at least 0.2d apart).

Of the plausible pairs, the pair with the most even horizontal spacing either side of the mouth centre line are selected as being nostrils.

The process 1000 for locating the eyebrows is shown in FIG. 17. The eyebrows are searched for in 6rx4r regions centered 3r above each eye. Initially, these regions are rescaled 1010 and convolved with Gabor wavelets 1020 to identify peaks in symmetry in the vertical direction. The real and imaginary components of the Gabor responses are combined to produce an absolute measure V of symmetry/asymmetry as follows:

Let $I_{Gabor}$ be the convolution of the image with a single vertically aligned Gabor wavelet, and denote the real (even) and imaginary (odd) components of $I_{Gabor}$ as $I_{even}$ and $I_{odd}$ V can then be formed as follows:

$$V = (1 - \hat{I}_{odd}) I_{even}$$

where $$\hat{I}_{odd} = \frac{I_{odd}}{\max_p \{\|I_{odd}(p)\|\}}, \quad I_{odd} = \text{Im}(I_{Gabor}), \quad I_{even} = \text{Re}(I_{Gabor})$$

The Gabor response in the vertical direction, $I_{Gabor}$ is obtained by a separable convolution as follows:

$$I_{Gabor} = w * g_2^T$$

where $$w(x) = g_2(x) e^{(jx)}$$

Where j is the imaginary root of −1, and x takes 4r distinct values uniformly distributed from −3π/2 to 3π/2, and $g_2$ is a 4rxr Gaussian vector with $\sigma_2 = r$ that characterizes the envelope of the Gabor filter kernel.

In the resulting image V, the eyebrows are characterized by light ridges above and below, and a dark ridge in the centre.

In step 1030 and 1040 the horizontal integral projection of V is obtained, and the maximums located. These maxima identify the light ridges above and below the eye. The height of the eyebrow is located at the minimum between these two maximums. Finally, in step 1050, the horizontal location of the eyebrows is estimated from this procedure as well. This estimate is then refined by relocating the eyebrows so their horizontal spacing is symmetric about the centre of the mouth.

In a final verification process, the system can further examine the topology of the features to determine whether the located features fit a set of predetermined rules. In step 60 of FIG. 1 the features are tested against the following topological constrains:

Relative horizontal positioning constraints:
Nostrils must not be centered more than 0.5d from the eye centre line.
The mouth must not be centered more than 0.15d from the eye centre line.
Relative vertical positioning constraints:
The nose must be located below $\frac{1}{3}^{rd}$ and above $\frac{5}{6}^{th}$ of the way from the eyes to the mouth.
Orientation constraints:
All feature pairs must be within 15 degrees of the horizontal.

Due to the likelihood that the subject's face is generally symmetrical it is desirable that all of the feature pairs that are located by this system should be approximately mirror images of each other. Accordingly, the similarity of each feature pair is measured by flipping a 2rx2r region centered on one half of the feature pair about a vertical axis, and taking its maximum normalized correlation with a 2.5rx2.5r region centered at the other half of the pair. If the mean similarity of all feature pairs is greater than a predetermined value, e.g. 0.5, the features register as a valid face. In the preferred embodiment the eyebrows are not included in this similarity check.

This system and method have been seen to perform well on a wide range of faces. However, subjects whose irises are lighter than their skin or who have a heavy dark beard or moustache may pose problems. By applying the vertical Gabor template used to detect the eyebrows for extracting the mouth in the presence of facial hair the present system can be adapted to work on people with beards and moustaches. Obviously many other refinements and variations are possible.

A system incorporating the aforedescribed method can be readily implemented on a programmable computer type workstation. An example such system is illustrated schematically 1100 in FIG. 18 wherein a computer system is arranged around a bus 1106 and includes a cpu 1101, memory 1102, permanent storage device 1103, Input/Output interconnection 1104 and network interconnection 1105.

Figure 18:
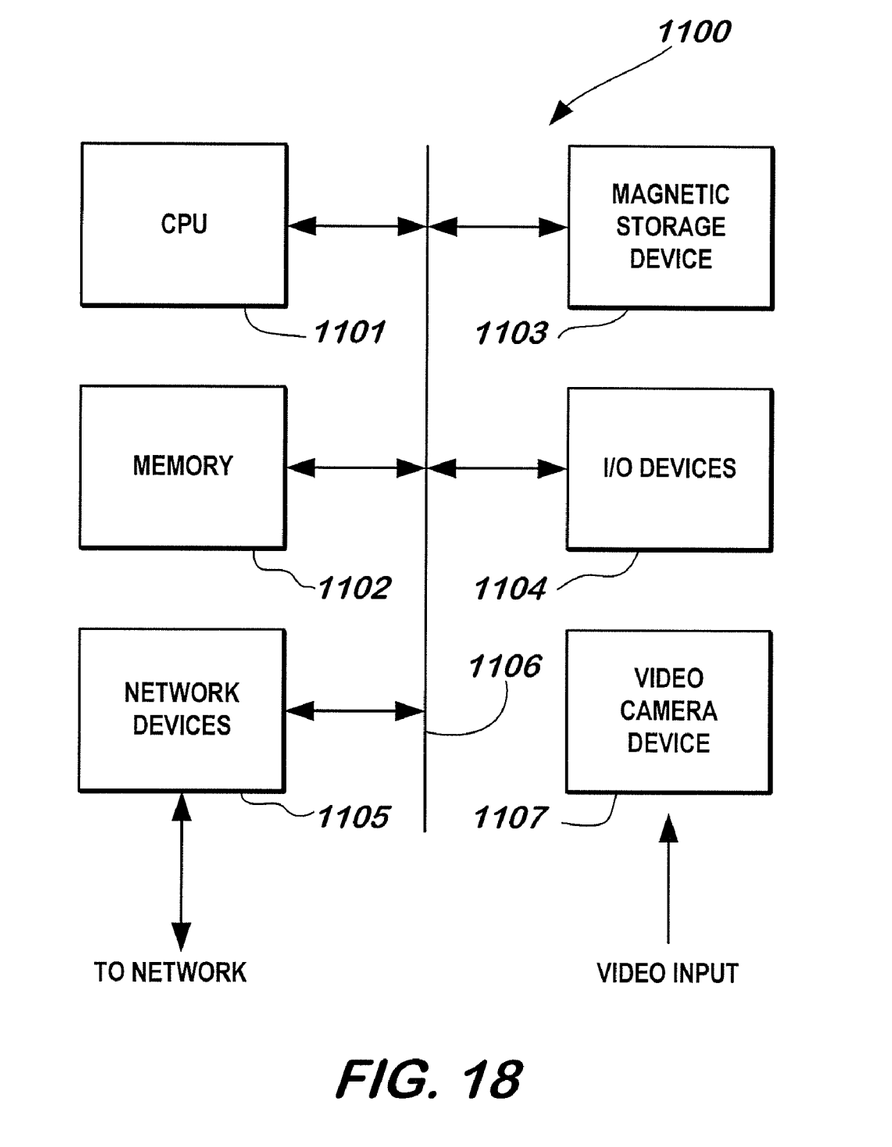
FIG. 18 illustrates schematically a system for utilization with the preferred embodiment.

Also connected to the computer system is a video camera device 1107 for the capture of images. The captured images can be stored on the magnetic storage device and subsequently processed by the CPU 1101 in conjunction with the memory 1102 so as to extract the eye location information.

It will be understood that the invention disclosed and defined herein extends to all alternative combinations of two or more of the individual features mentioned or evident from the text or drawings. All of these different combinations constitute various alternative aspects of the invention.

The foregoing describes embodiments of the present invention and modifications, obvious to those skilled in the art can be made thereto, without departing from the scope of the present invention.

What is claimed is:

1. A method of utilizing a computer system to automatically detect the location of a face within an input image, the method comprising the steps of:

(a) detecting a pair of eye locations within the input image;
(b) based on said pair of eye locations, extracting a potential face region within the input image;
(c) enhancing the extracted potential face region;
(d) detecting facial features within the enhanced extracted potential face region;
(e) classifying the facial features; and
(f) based on the classified facial features, verifying the face topology within the potential face region to determine the location of the face within the input image.

2. A method as claimed in claim 1 wherein said step (a) further comprises the sub steps of:
  (a1) identifying a plurality of eye candidates using a fast symmetry transform;
  (a2) applying a Hough transform centered on each one of said plurality of eye candidates;
  (a3) rating the quality of each of said Hough transformed plurality of eye candidates; and
  (a4) selecting one pair of eye locations from said plurality of eye candidates based on one or more geometrical constraints.

3. A method as claimed in claim 1 wherein said step (b) further comprises the sub steps of:
  (b1) utilizing the location of said detected pair of eye locations to extract a region around said location to form said potential face region.

4. A method as claimed in claim 1 wherein said step (c) further comprises the sub steps of:
  (c1) utilizing local radial symmetry to construct a face mask of likely facial features within said potential face regions.

5. A method as claimed in claim 1 wherein said step (c) further comprises the sub steps of:
  (c1) reseating the intensity of the facial features within the potential face region.

6. A method as claimed in claim 1 wherein said step (d) further comprises the sub steps of:
  (d1) locating at least one of the mouth, nostrils or eyebrows of a face.

7. A method as claimed in claim 1 wherein said step of verifying the face topology includes using the spatial relationship between facial features in said images.

8. A method as claimed in claim 1 in which said at least one image is one of series of images.

9. A method as claimed in claim 1 wherein said step (c) further includes the steps of:
  (c1) constructing a gradient image of the face region; and
  (c2) calculating a local radial symmetry of the gradient image of the face region.

10. A method as claimed in claim 1 wherein said step (a) includes the steps of:
  (a1) applying a dark radial symmetry transform to the input image so as to produce a first transformed image;
  (a2) applying a Hough transform to the first transformed input image to produce a second transformed image.

11. A method as claimed in claim 10 wherein said step (a) further includes the steps of: dividing the image into a number of regions; determining the location of a maximum value of the dark radial symmetry transform in each region; applying a Hough transform to the area centered on each maximum value so as to produce said second transformed image; utilizing geometric constraints and relative image values in said second transformed image to determine potential eye locations within the input image.

12. A method as claimed in claim 1 wherein said step (c) further includes the steps of:
  (c1) constructing a gradient image of the face region; and
  (c2) calculating a local radial symmetry of the gradient image of the face region.

13. A method of detecting at least one facial feature of a subject in an image, said method including the steps of:
  (a) determining a pair of points, within the current image, representing the position of the subject's eyes;
  (b) selecting at least a portion of said current image, based on the position of said points within the current image;
  (c) enhancing the selected portion of said current image;
  (d) detecting one or more features within said enhanced image portion;
  (e) classifying said one or more detected features as potential facial features; and
  (f) determining whether at least one facial feature has been identified by comparing the relative positions of said one or more potential facial features within said enhanced image portion with at least one facial feature positioning condition.

14. A method as claimed in claim 13 wherein the step (a) includes the sub steps of: identifying a plurality of candidate points using a fast symmetry transform; applying a Hough transform centered on each one of said candidate points; rating the quality of each of said plurality of candidate points, based on at least one of the following: a fast symmetry transform, a Hough transform, a correlation measurement, or an intensity value centered on the candidate point; and selecting one pair of points from said plurality of candidates points.

15. A method as claimed in claim 13 wherein said image is one image of series of images.

16. A method of detecting eyes within an input image, the method comprising the steps of:
  (a) applying a dark radial symmetry transform to the input image so as to produce a first transformed image;
  (b) dividing the image into a number of regions;
  (c) determining a location of a maximum value of the dark radial symmetry transform in each region;
  (d) applying a Hough transform to the area centered on each maximum value so as to produce a second transformed image; and
  (e) analyzing geometric constraints and relative image values in said second transformed image to determine potential eye locations within the input image.

* * * * *